April 8, 1930.  W. W. SHAW  1,753,724

AUTOMATIC BACKWATER VALVE

Filed Nov. 23, 1928

Witness:
Harry R. L. White

Inventor:
Wallace W. Shaw.
By Edward Fay Wilson, atty.

Patented Apr. 8, 1930

1,753,724

UNITED STATES PATENT OFFICE

WALLACE W. SHAW, OF CHICAGO, ILLINOIS

AUTOMATIC BACKWATER VALVE

Application filed November 23, 1928. Serial No. 321,361.

This invention relates to improvements in automatic backwater valves, particularly for use in basements to prevent the water backing up into the basement through the basement drain.

It is usual to provide what is known as a soil pipe basement drain with its upper end open and flush with the basement floor. Usually an open grating covers the open end of the pipe, and many such drains are left otherwise open, with the result that upon a sudden large rainfall which the main sewer cannot carry away quickly, the water backs up into the basement through such drain opening. Many devices have been provided for closing the opening, but I have found serious defects or objections to the forms now in common use.

My object is to provide a valve for this purpose which can be easily and quickly installed without making any changes in the drain pipe or surrounding floor, which will not need attention once it has been installed, which will automatically seal the drain pipe upon the rising of the water therein, which will effectively seal the opening even though sand, dirt or other particles may be caught between the seat and the valve, and which will afford ample drainage passage through the device.

The invention will be more readily understood by reference to the accompanying drawings forming part of this specification, and in which:—

Figure 1:
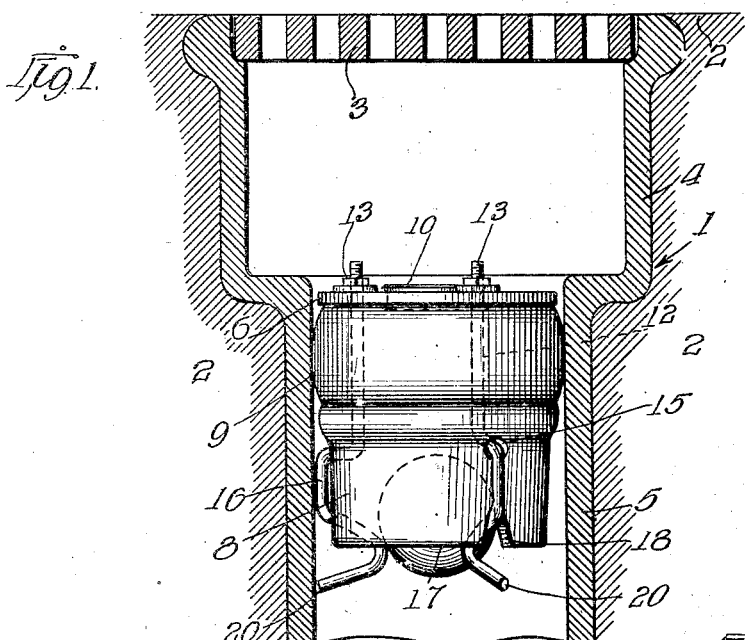
Fig. 1 is a fragmentary vertical section of a drain pipe, showing a device in side elevation embodying my invention in a preferred form.
Figure 2:
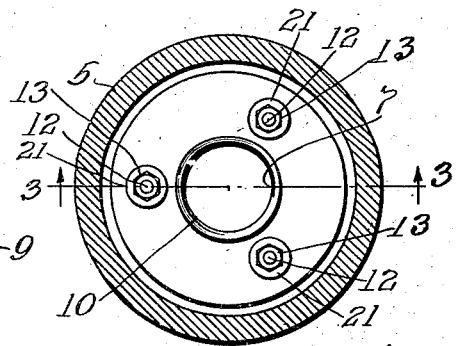
Fig. 2 is a horizontal section on the line 2—2 of Fig. 1.

In said drawings, 1 represents a basement drain pipe, the upper open end of which is substantially flush with the floor 2 of the basement and is adapted to be protected by a grating 3. The pipe 1 as shown has an enlarged upper end 4, though this is not always the case. The body 5 of the pipe 1 extends up nearly if not quite to the floor surface, and my device, as shown, is adapted to be placed in the body of the pipe, though it might also be arranged to fit within the enlarged end 4 if such position were desirable for any reason.

The device itself comprises a cage carrying a ball valve adapted to float in water and simple means for securing and sealing the cage within the drain pipe. The cage consists of an upper or top plate 6 provided with a central opening 7, a lower tubular member 8, an expansible rubber ring 9 arranged between the plate and the tubular member, and means for drawing these two members toward each other to cause the rubber ring to be enlarged in diameter and thereby secured in the pipe 5 and effect its sealing.

As it is essential that the cost of devices of this character be kept low, the plate 6 and the tubular member 8 are preferably made of iron castings; and as these parts and the drain pipe are rough castings, they cannot be fitted tight with each other but are of such relative diameters that the plate and tubular member can readily be inserted into the pipe, depending on the expansible ring 9 to effect the tight sealing of the pipe.

As the plate 6 is preferably made of iron, I preferably provide a non-corrosive valve seat 10 in the central opening 7. This seat preferably consists of a short piece of brass tubing formed tightly into the opening 7 and formed to present a smooth rounded lower surface 11 to receive the valve.

For drawing the plate 6 and tubular member 8 together, I preferably provide three connecting rods 12 threaded at their upper ends to receive nut 13. These rods pass through openings provided in the plate 6 and are arranged just within the inner surface of the rubber ring 9. The tubular member 8 has a large central opening 14, and the rods extend straight down through this opening and are secured to or engaged with this tubular member so that when the nuts 13 are screwed down the two members will be drawn together upon the rubber ring 9.

This engagement of the rods with the tubular member is preferably as follows: The tubular member below the seat of the rubber ring 9 is provided in its wall with openings 15, one for each rod 12, and the rods are bent outwardly to project through these openings, thus producing L-shaped heads or shoulders on the rods which engage the tubular member. The rods do not end at this point but are extended down and formed to provide a support for a ball valve 16. This valve is preferably made of spongy rubber, as this has the qualities desired. It is firm, yet yielding, it will float in water, and it will not rapidly deteriorate but will last a long time in condition to close upon the seat 10 and seal the pipe against the upward flow of water. Often sand or dirt accumulates or lodges on the valve seat or the valve, and by the use of the spongy rubber valve this foreign material caught between the seat and valve will not prevent the sealing of the pipe, as the valve will yield sufficiently to close tight.

Figure 3:
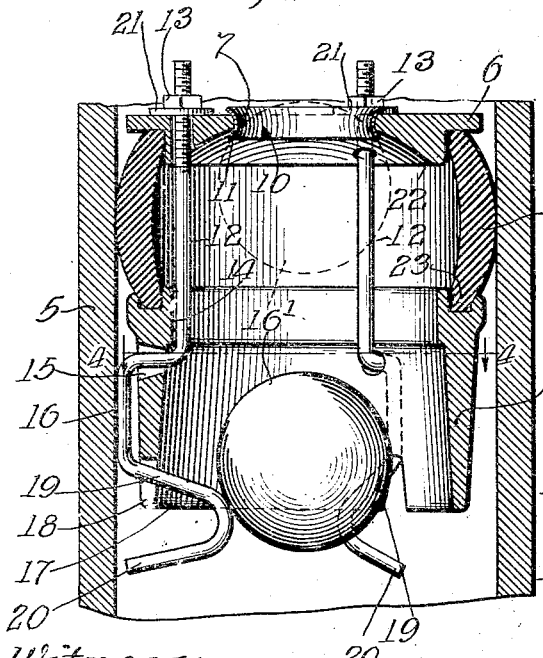
Fig. 3 is a central vertical section on the line 3—3 of Fig. 2.
Figure 4:
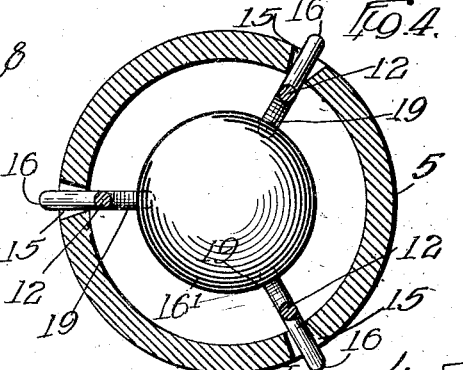
Fig. 4 is a horizontal section on the line 4—4 of Fig. 3.

To form a support for the valve when it drops down from the seat, the rods 12 extend down outside the tubular member 8 below the openings 15 as shown at 16, and the lower end 17 of the tubular member is notched as shown at 18 to permit the rods to be bent inwardly and extend within the lower end of the tubular member as shown at 19. They extend in to a point substantially half way to the center, and then they are bent outwardly again, their free ends 20 extending outwardly and downwardly, and these ends are of a length so that they extend close to the inner surface of the pipe 5. They extend close enough to the pipe 5 so that they will contact at their outer ends with the pipe before they could be bent down far enough to permit the ball valve 16 to drop through. The ball valve, as shown in full lines in Fig. 3, normally rests upon the bent-in lower end portions of the rods, and when it is lifted by a back flow of water, it is guided up between the rod connections 12 to the seat 10 upon which it is seated by the water pressure, as shown in dotted lines, Fig. 3.

In order to avoid corrosion, the rods 12 and nuts 13 are preferably made of a non-corrosive metal such as brass. To seal the openings in the plate 6 through which the rods 12 project, washers 21 made of yielding material such as fiber or water-proofed paper are arranged on the rods 12 beneath the nuts 13.

The plate 6 is provided with a short depending nozzle 22 forming a shouldered groove to receive the upper end of the ring 9, and the upper end of the tubular member 8 is provided with a circumferential groove 23 to receive the lower end of the ring 9. The ring is preferably slightly crescent shaped in cross-section, the convex side being presented outwardly, and consequently, when the plate 6 and tubular member 8 are drawn toward each other, the middle portion of the ring 9 is deflected outwardly and pressed lightly against the inner surface of the pipe 5. This ring, being somewhat soft or yielding, seals the pipe tightly, even though the pipe is more or less rough.

It will now be understood that I have provided a very simple automatic valve which can be produced at a relatively low cost of labor and expense, which can be easily applied without making any change in the drain pipe or the surrounding floor, which will last indefinitely, which will effectively prevent water flowing upward through the pipe even though foreign matter such as sand or grit may have lodged on the valve or its seat, and which affords ample passage through the device for water to flow downwardly through the drain pipe.

As many modifications of my invention will readily suggest themselves to one skilled in the art, I do not limit or confine my invention to the specific details of construction herein shown and described.

I claim:

1. In a device of the kind described, a top plate provided with a central opening, a lower annular member, an expansible packing ring between said members, connecting rods extending up through the top plate and having operative connection with the lower member, nuts on the upper ends of the rods by means of which the two members can be drawn toward each other to expand the packing ring, a ball valve adapted to be lifted by water to close said opening, and the lower end portions of said rods projecting inwardly to prevent the escape of said ball valve.

2. In a device of the kind described, a top plate provided with a central opening, a lower annular member, an expansible packing ring between said members, connecting rods extending up through the top plate and having operative connection with the lower member, nuts on the upper ends of the rods by means of which the two members can be drawn toward each other to expand the packing ring, a ball valve adapted to be lifted by water to close said opening, the lower end portions of said rods being bent inwardly to prevent the escape of said ball valve and the free end of said rods being bent outwardly and adapted to contact with the wall of a pipe in which the device is used to prevent the lower portions of the rods being spread apart sufficiently to allow the escape of the ball valve.

3. In a device of the kind described, an upper ring member having a central opening, a lower annular member, a yielding expansible packing ring between the two members, adjustable connectors passing through and operatively connecting said members and by which they can be drawn toward each other to expand said packing ring, a ball valve adapted to be lifted to close said opening, and the lower ends of the connectors formed to provide a cage to prevent the escape of said valve.

4. In a device of the kind described, an upper ring member having a central opening, a lower annular member, a yielding expansible packing ring between the two members, rod-like bolts connecting said members and by which they can be drawn toward each other to expand said packing ring, a ball valve adapted to be lifted to close said opening, the lower ends of the rods bent to form a shoulder for contact with the lower member and to form an inwardly projecting portion to prevent the escape of said ball and openings in said members through which said rods can be freely threaded for assembling said device.

5. In a device of the kind described, an upper member of corrosible metal such as cast iron and provided with a central opening, and a valve seat secured in said opening and comprising a ring of non-corrosive malleable metal conformed to the wall of said opening and of larger diameter at its upper and lower ends than at its middle portion.

6. In a device of the kind described, an upper member of corrosible metal such as cast iron and provided with a central opening, and a valve seat secured in said opening and comprising a ring of non-corrosive malleable metal formed in place and larger in diameter at its upper and lower ends than the diameter of said opening.

7. A back-water valve comprising two metallic rings and an expansible ring arranged between them, rod-like connectors connecting the metallic rings together and by which the expansible ring can be expanded, a ball valve, and the lower ends of the connectors formed to provide a cage to prevent the escape of the valve.

In testimony whereof, I have hereunto set my hand this 3rd day of November, 1928.

WALLACE W. SHAW.